(12) United States Patent
Lin et al.

(10) Patent No.: US 8,890,030 B2
(45) Date of Patent: Nov. 18, 2014

(54) HYBRID WELDING APPARATUSES, SYSTEMS AND METHODS

(75) Inventors: Dechao Lin, Greer, SC (US); Srikanth Chandrudu Kottilingam, Simpsonville, SC (US); Yan Cui, Greer, SC (US); David Edward Schick, Greenville, SC (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 13/599,099

(22) Filed: Aug. 30, 2012

(65) Prior Publication Data

US 2014/0061171 A1    Mar. 6, 2014

(51) Int. Cl.
*B23K 26/14* (2014.01)
*B23K 26/20* (2014.01)
*B23K 31/02* (2006.01)

(52) U.S. Cl.
CPC .............. *B23K 26/14* (2013.01); *B23K 26/1429* (2013.01); *B23K 26/20* (2013.01); *B23K 31/02* (2013.01)
USPC ............... 219/137 R; 219/137.2; 219/121.63; 219/121.64; 228/175

(58) Field of Classification Search
CPC ...................................................... B23K 26/00
USPC ........ 219/121.63, 121.64, 128, 137 R, 137.2; 228/175
See application file for complete search history.

(56) References Cited

U.S. PATENT DOCUMENTS

| 4,689,466 | A | 8/1987 | Hoshinouchi et al. |
| 5,006,688 | A | 4/1991 | Cross |
| 5,700,989 | A | 12/1997 | Dykhno et al. |
| 8,378,260 | B2 * | 2/2013 | Knipper ................ 219/137 WM |
| 2005/0011868 | A1 | 1/2005 | Matile et al. |
| 2007/0017906 | A1 | 1/2007 | Nowak et al. |
| 2010/0078412 | A1 | 4/2010 | Diez et al. |
| 2010/0236067 | A1 | 9/2010 | Hu et al. |
| 2011/0198317 | A1 | 8/2011 | Lin |

FOREIGN PATENT DOCUMENTS

| JP | 2006095559 A * | 4/2006 |
| WO | 2006133034 A1 | 12/2006 |

OTHER PUBLICATIONS

Steven G. Shi, Paul Hilton, Steve Mulligan and Geert Verhaeghe, "Hybrid Nd: YAG laser-mag welding of thick section steel with adaptive control". TWI (http://www.twi.co.uk/content/spsgsoct2004.html), p. 1-23, Oct. 2004, Cambridge UK.
"Lecture 3.3: Principles of Welding", ESDEP Lecture Note [WG3](http://www.haiyangshiyou.com/esdep/master/wg03/t0300.htm), Nov. 22, 2010.

(Continued)

*Primary Examiner* — Samuel M Heinrich
(74) *Attorney, Agent, or Firm* — Blake A. Nickles; Ernest G. Cusick; Frank A. Landgraff

(57) ABSTRACT

Hybrid welding apparatuses include a laser that produces a leading laser beam, and, an arc welder that produces a trailing backhand weld arc, wherein the leading laser beam and the trailing backhand weld arc are directed towards a common molten pool, and wherein the trailing backhand weld arc trails the leading laser beam as the leading laser beam progresses in a weld direction.

20 Claims, 2 Drawing Sheets

(56) References Cited

OTHER PUBLICATIONS

Moriaki Ono, Yukio Shinbo, Akihide Yoshitake and Masanori Ohmura, "Development of Laser-arc Hybrid Welding", NKK Techinical Review (http://www.lac-online.nl/dfl/f/development_of_hybrid_welding.pdf), No. 86, p. 8-12 (2002).
"Lecture 3.4: Welding Processes", ESDEP Lecture Note [WG3](http://www.haiyanshiyou.com/esdep/master/wg03/toc.htm), Nov. 22, 2010.
"Laser Welding Review", Engineers Edge Solutions by Design (http://www.engineersedge.com/manufacturing/laser_welding.htm), Jan. 2011.
J.W. Elmer, "Characterization of Defocused Electron Beams and Welds in Stainless Steel and Refractory Metals using the Enhanced Modified Faraday Cup Diagnostic", Lawrence Livermore National Laboratory, p. 1-9, Jan. 23, 2009.
"Fiber laser", Wikipedia (http://en.wikipedia.org/wiki/Fiber_laser), Mar. 29, 2006.
"Disk laser", Wikipedia (http://en.wikipedia.org/wiki/Disk_laser), Jan. 25, 2007.
Nd: YAG laser, Wikipedia (http://en.wikipedia.org/wiki/Nd:YAG_laser), Feb. 26, 2004.
Carbon dioxide laser, Wikipedia (http://en.wikipedia.org/wiki/Carbon_dioxide_laser), Nov. 17, 2008.

* cited by examiner

HYBRID WELDING APPARATUSES, SYSTEMS AND METHODS

BACKGROUND OF THE INVENTION

The subject matter disclosed herein relates to welding and, more specifically, to hybrid welding.

Welding can be utilized for a variety of manufacturing or repair processes in multiple different industrial settings. For example, welding can be utilized to join multiple components, repair cracks, gaps or defects in used components, build up material in used or new components, or otherwise weld or join one or more components as needed for a particular application. However, the ability or speed that welding can occur can be limited by a number of factors including the thickness of the components being welded and the power of the welding apparatus.

Hybrid welding can combine the utilization of both laser welding and arc welding to potentially weld at a faster rate while still achieving full penetration. However, as components become thicker, an increase in laser power may still be required for full penetration. The configuration of the laser welder and the arc welder may thereby be adjusted to influence the weld result. For example, hybrid welding can include using a leading laser welder followed by a forehand arc welder to provide relatively smooth welds. However, such configurations may be limited in the depth of weld penetration due to the laser impinging on a relatively cold base material and the arc not being able to build up a strong and stable keyhole through the entire welding process. Conversely, hybrid welding can alternatively include using a trailing laser welder that follows a backhand arc welder to provide deeper penetration than the previously described configuration. However, such configurations can create relatively rough and narrow weld surfaces that require subsequent processing to finish the welded surface.

Accordingly, alternative hybrid welding apparatuses, systems and methods would be welcome in the art.

BRIEF DESCRIPTION OF THE INVENTION

In one embodiment, a hybrid welding apparatus is disclosed. The hybrid welding apparatus includes a laser that produces a leading laser beam, and, an arc welder that produces a trailing backhand weld arc. The leading laser beam and the trailing backhand weld arc can be directed towards a common molten pool, and the trailing backhand weld arc can trail the leading laser beam as the leading laser beam progresses in a weld direction.

In another embodiment, a hybrid welding system is disclosed. The hybrid welding system includes a hybrid welding apparatus that includes a laser that produces a leading laser beam, and an arc welder that produces a trailing backhand weld arc. The hybrid welding system further includes at least one component having a weld area, wherein the leading laser beam and the trailing backhand weld arc are directed towards the weld area to create a common molten pool, and wherein the trailing backhand weld arc trails the leading laser beam as the leading laser beam progresses in a weld direction.

In yet another embodiment, a hybrid welding method is disclosed. The hybrid welding method includes directing a leading laser beam from a laser towards a weld area on at least one component, and, directing a trailing backhand weld arc from an arc welder towards the weld area to form a common molten pool, wherein the trailing backhand weld arc trails the leading laser beam as the leading laser beam progresses in a weld direction.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A hybrid welding system as disclosed herein generally comprises a hybrid welding apparatus and at least one component having a weld area. The hybrid welding apparatus generally comprises a laser and an arc welder. The laser directs a leading laser beam towards the weld area of the at least one component. The arc welder also directs a trailing backhand weld arc towards the same weld area so that the leading laser beam and the trailing backhand weld arc create a common molten pool. Moreover, to allow for both deep weld penetration as well as a smooth surface, the trailing backhand weld arc trails the leading laser beam as the leading laser beam progresses in a weld direction. Hybrid welding apparatuses, systems and methods will now be described in more detail herein.

Figure 1:
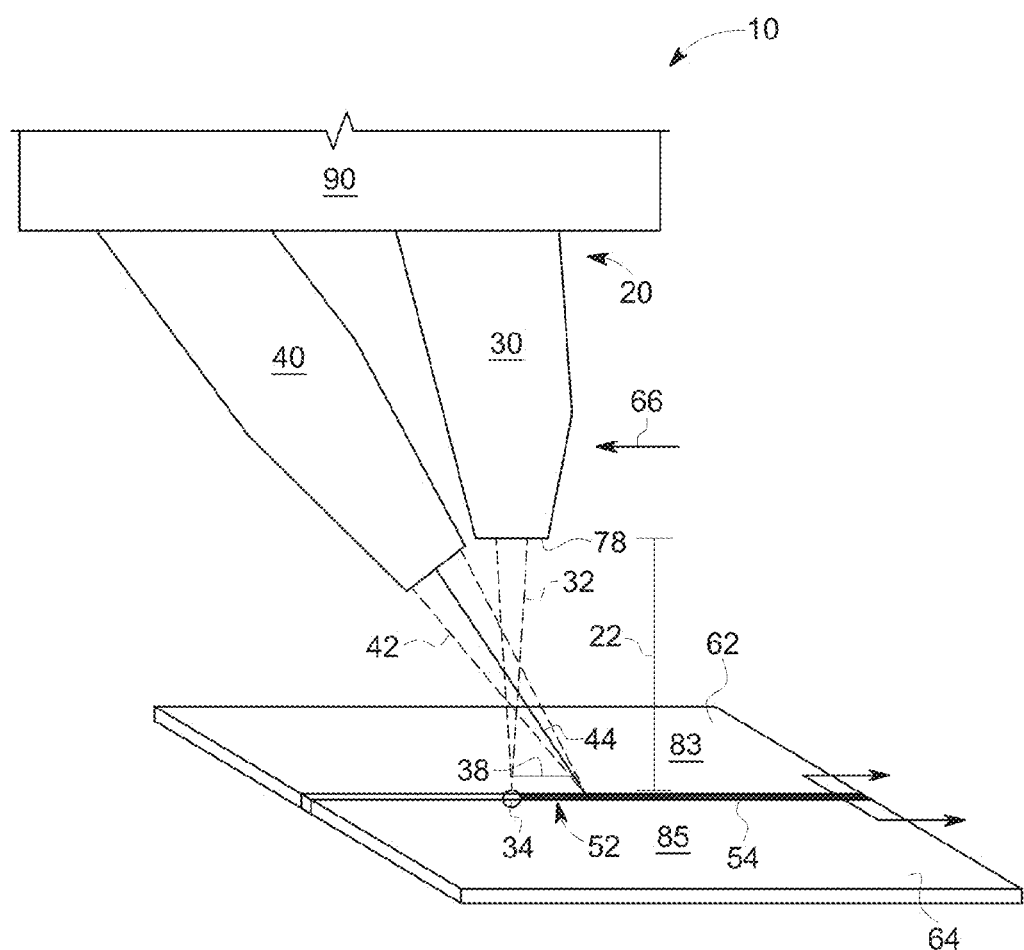
FIG. 1 is a perspective view of a schematic representation of a hybrid welding system according to one or more embodiments shown or described herein.

Referring now to FIG. 1, a hybrid welding system 10 having a hybrid welding apparatus 20 is schematically illustrated. The hybrid welding apparatus 20 can comprise a laser 30 and an arc welder 40. The laser 30 can comprise any laser system that can produce and direct a laser towards a target area such as a common molten pool 52 of a weld 54. For example, in some embodiments, the laser 30 is selected from a Nd:YAG laser, a $CO_2$ laser, a fiber laser, or a disk laser. In some embodiments, the laser 30 is a high-density powered laser.

Figure 2:
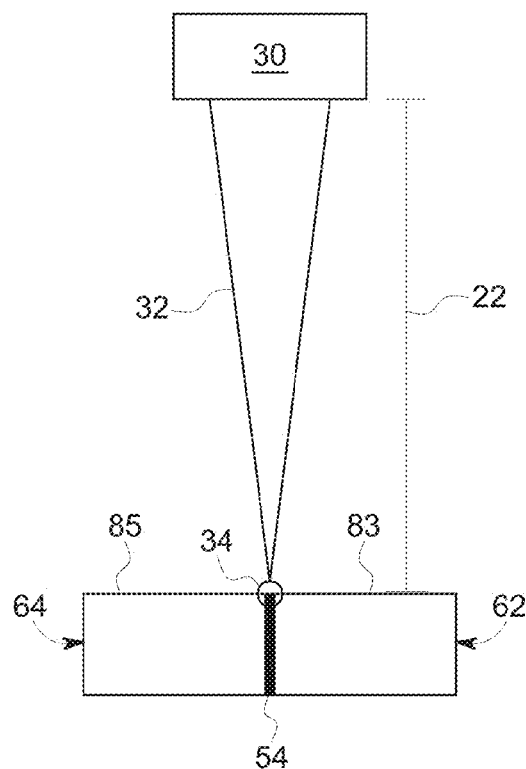
FIG. 2 is a schematic view of a laser of a hybrid welding apparatus according to one or more embodiments shown or described herein.

As illustrated in FIGS. 1-2, the laser 30 produces a leading laser beam 32. The leading laser beam 32 is directed towards the common melt pool 52 of the weld 54 such that it is subsequently followed by the trailing backhand weld arc 42 as will become appreciated herein. By providing a leading laser beam 32 before the trailing backhand weld arc 42, the common melt pool 52 of the weld 54 can become more energized (e.g., heated) and allow for a deeper penetration weld in the material. The common molten pool 52 can thereby provide a full penetration weld 54 between the components 62 and 64.

As illustrated in FIGS. 1 and 2, the laser head 78 of the laser 30 is separated from the top surface 83 and 85 of the components 62 and 64 by a height 22. In some embodiments, the height 22 may be defined by the manufacture of the laser head 78. In some embodiments, the height 22 between the laser head 78 and the top surface 83 and 85 of the components 62 and 64 remains fixed. In other embodiments, the height 22 between the laser head 78 and the top surfaces 83 and 85 of the components 62 and 64 is varied.

In some embodiments, such as that illustrated in FIGS. 1 and 2, the leading laser beam 32 has a focus point 34 that is focused on the surfaces 83,85 of the components 62,64. In such embodiments, the focus distance (i.e., the length of the laser between the laser head 78 and the focus point 34) is the same as the height 22 between the laser head 78 and the top surfaces 83 and 85 of the components 62 and 64. Such embodiments can provide the greatest laser power to the weld 54 by focusing all or most of the laser energy on a smaller surface area and providing greater penetration ability. Specifically, such embodiments can utilize a laser 30 of relatively lower power (e.g., about 4 kW such as for welding components having a thickness of up to about 6.35 mm) by focusing all or most of its energy at the weld location as opposed to distributing it to a wider area. For thicker components, a higher laser power may be needed, such as, for example, up to or exceeding 20-kW.

However, in some embodiments, the laser 30 can comprise a leading defocused laser beam that is positively defocused or negatively defocused. As used herein "positively defocused" means that the focus point 34 of the defocused laser is above the surface 83 and 85 of the components 62 and 64 to be joined, such that the remaining energy or leading defocused laser beam 32 from the defocused laser is directed outward towards the surface 83 and 85 of components 62 and 64 or the common molten pool 52 in a wider manner. "Negatively defocused" means that the focus point 34 of the defocused laser is below the surface 83 and 85 of the components 62 and 64. The leading defocused laser beam, may thereby distribute its energy over a larger area such as may be required for wider welds between the components 62 and 64. It should be appreciated, however, that a defocused laser beam may require a greater power source to provide the same amount of energy to a specific weld location since the defocused laser beam distributes its energy over a greater area. In even some embodiments, the focus point 34 of the laser may vary during welding such that the leading laser beam 32 transitions between a focused leading laser beam and a defocused leading laser beam (e.g., a positively defocused leading laser beam).

Referring back to FIG. 1, the hybrid welding apparatus 20 further comprises the arc welder 40 in addition to the laser 30. In one embodiment, the arc welder 40 is selected from welders including consumable electrodes, such as, but not limited to, a gas metal arc welder (GMAW) (e.g. a metal inert gas (MIG) welder), a flux cored arc welder (FCAW) and welders having non-consumable electrodes with wire feeding, such as, but not limited to, a gas tungsten arc welder (GTAW) with wire feeding and a plasma arc welder (PAW) with wire feeding.

The arc welder 40 produces a trailing backhand weld arc 42 that trails the leading laser beam 32 as the leading laser beam 32 progresses in the weld direction 66. A "backhand weld arc" is defined herein as a weld arc that is directed at an angle back towards the completed weld 54 while the arc welder 40 progresses in a weld direction 66 in front of the completed weld 54 (as illustrated in FIG. 1). In some embodiments, the leading laser beam 32 can be produced at the same time as the trailing backhand weld arc 42 to increase the combination of energy from the two sources. The combination of energy from the leading laser beam 32 and the trailing backhand weld arc 42 can allow for further penetration of the weld 54 between the components 62 and 64. For example, the consumable wire electrode 44 can melt or continue melting a portion of the edges of the components 62 and 64 to form or continue forming the common molten pool 52. In one embodiment, the arc welder 40 may also emit shielding gas for protecting the weld 54 during operation.

In some embodiments, the laser 30 and the arc welder 40 are automated. In some embodiments, the laser 30 and the arc welder 40 are mounted in separate places. In even some embodiments, such as that illustrated in FIG. 1, the laser 30 and the arc welder 40 are mounted on a single mount 90. The laser 30 and the arc welder 40, or simply the mount 90 itself if present, may be moved relative to the components 62 and 64 to be welded at a suitable rate of speed for welding, such as, for example between approximately 762 millimeters per minute (30 inches per minute) to approximately 3048 millimeters per minute (120 inches per minute), or alternatively between approximately 1016 millimeters per minute (40 inches per minute) to approximately 2286 millimeters (90 inches per minute), or alternatively between approximately 1270 millimeters per minute (50 inches per minute) to approximately 2032 millimeters (80 inches per minute). In some embodiments, the laser 30 and the arc welder 40 are held stationary while the components 62 and 64 to be welded are moved at the above discussed rates.

The combined energy from the laser 30 and electric arc welder 40 can thereby be directed toward the components 62 and 64 to create a common molten pool 52. The common molten pool 52 can operate to provide a full penetration weld 54 to connect the components 62 and 64 (and potentially bridge any gap there between) at a high constant weld speed. As used herein, "common molten pool" 52 refers to the molten material created by the combination of energy from the leading laser beam 32 and the trailing backhand weld arc 42 that includes a portion of each component 62 and 64 and the consumable wire electrode 44 (if present). The intermixed molten materials from the common molten pool 52 join upon cooling to form one continuous piece joining components 62 and 64.

As illustrated in FIG. 1, a distance 38 separates the leading laser beam 32 and consumable wire electrode 44 of arc welder 40. In some embodiments, the distance 38 can be between approximately 0.5 millimeters to approximately 12 millimeters, or alternatively between approximately 3.0 millimeters to approximately 8.0 millimeters, or alternatively between approximately 3.5 millimeters to approximately 6.0 millimeters to obtain adequate interaction of the two heat sources to create a stable common molten pool 52. For example, depending on the specific laser 30, arc welder 40 and components 62 and 64, distances 38 under 2.5 millimeters may cause the laser beam 32 to contact the consumable wire electrode 44 of the arc welder 40 which may result in molten material splattering and an unstable trailing backhand weld arc 42. Conversely, distances 38 greater than 12 millimeters may not allow for adequate interaction of the leading laser beam 32 and trailing backhand weld arc 44 to create a common molten pool 52.

As stated above, in addition to the hybrid welding apparatus 20, the hybrid welding system 10 can further comprise at least two adjacent components 62 and 64. In some embodiments, the laser 30 and arc welder 40 can be arranged and disposed to direct energy toward at least two adjacent work pieces or components 62 and 64 and a gap there between. In some embodiments, the laser 30 and arc welder 40 can be arranged and disposed to direct energy towards a crack or joint in a single component (not illustrated).

The components 62 and 64 to be welded can be selected from materials such as ferrous and non-ferrous materials. Examples of ferrous and non-ferrous materials include, but are not limited to, superalloys, mild steel, high-strength steel, stainless steel, titanium, aluminum, and combinations thereof.

In some embodiments, a bridge piece can be placed in a gap between the components 62 and 64 to create a joint. The bridge piece may be, for example, any wire, shim or other filler material that sufficiently fits into the gap and is generally adjacent to, or touching, the components 62 and 64 to be welded. In one embodiment, the bridge piece can be selected from materials that are similar to the component 62 and 64 materials. In another embodiment, the bridge piece can be selected from a material that is different from the components 62 and 64. In some embodiments, the bridge piece may be, for example, a stacked wire, a stacked shim, or combinations thereof. In some embodiments, the height of the shim can be less than the height of the components 62 and 64. In some embodiments, the shim height can be equal to or greater than that of the components 62 and 64.

The hybrid welding apparatus may similarly be used for a hybrid welding method. The hybrid welding method can first comprise directing a leading laser beam 32 from a laser 30 towards a target location adjacent at least one component. The target location can comprise, for example, a crack, joint, seam, repair site or the like. The hybrid welding method can further comprise directing a trailing backhand weld arc 42 from an arc welder 40 towards the target location to form a common molten pool 52. As discussed above, the trailing backhand weld arc 42 can trail the leading laser beam 32 as the leading laser beam 32 progresses in the weld direction 66.

EXAMPLE

Figure 3:
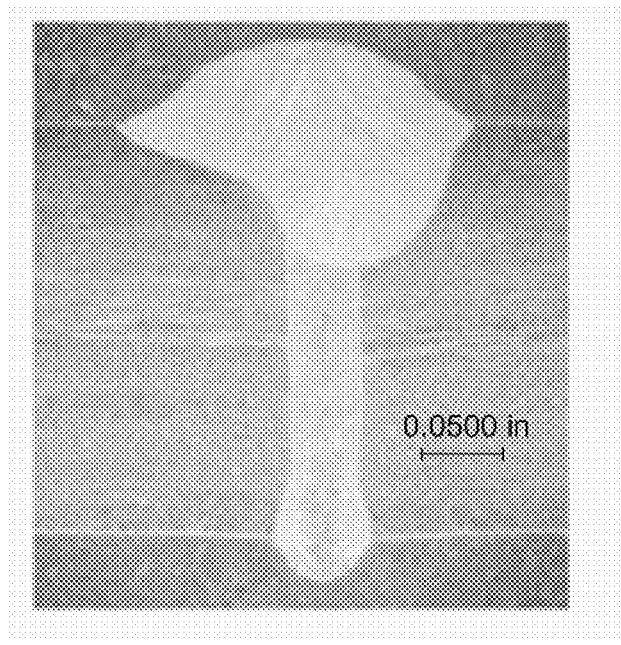
FIG. 3 is a cross-sectional view of a full penetration weld created by the hybrid welding system according to one or more embodiments shown or described herein.

Two components were placed adjacent to each other in order to perform a butt joint weld a using hybrid welding system as disclosed herein. Each of the components comprised a 6.35 mm thick piece of stainless steel (SS304L). The laser produced a leading laser beam of 4-kW and the arc welder comprised a GMAW that produced a trailing backhand weld at wire feeding rate of 500 imp with voltage setting at 26V. The leading laser beam and the trailing backhand weld arc progressed in the weld direction at a speed of 60 inches per minute (ipm). Microscopic analysis (presented in FIG. 3) verified a full penetration weld was achieved.

It should now be appreciated that hybrid welding apparatuses, systems and methods that include leading laser beams and trailing backhand weld arcs can produce full penetration welds for relatively thick components and at relatively fast welding speeds with a relatively lower powered laser. The hybrid welding apparatuses, systems and methods can be used for a variety of weld types including butt weld joints, edge weld joints, tee weld joints, and corner weld joints. Moreover, the hybrid welding apparatuses, systems and methods may be used in any process where welding is required including manufacturing, remanufacturing, and repair applications.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A hybrid welding apparatus comprising:
a laser that produces a leading laser beam; and,
an arc welder that produces a trailing backhand weld arc, wherein the leading laser beam and the trailing backhand weld arc are directed towards a common molten pool, and wherein the trailing backhand weld arc trails the leading laser beam as the leading laser beam progresses in a weld direction.

2. The hybrid welding apparatus of claim 1, wherein the arc welder is selected from a gas tungsten arc welder, a gas metal arc welder, a flux cored arc welder, or a plasma arc welder.

3. The hybrid welding apparatus of claim 1, wherein the laser is selected from a Nd:YAG laser, a $CO_2$ laser, a fiber laser, or a disk laser.

4. The hybrid welding apparatus of claim 1, wherein the laser has a power of less than about 4-kW.

5. The hybrid welding apparatus of claim 1, wherein the leading laser beam and the trailing backhand weld arc advance in the weld direction at a rate from about 760 millimeters per minute to about 3050 millimeters per minute.

6. The hybrid welding apparatus of claim 1, wherein the trailing backhand weld arc trails the leading laser beam by a distance from about 0.5 millimeters to about 12 millimeters.

7. A hybrid welding system comprising:
a hybrid welding apparatus comprising a laser that produces a leading laser beam, and an arc welder that produces a trailing backhand weld arc; and,
at least one component having a weld area, wherein the leading laser beam and the trailing backhand weld arc are directed towards the weld area to create a common molten pool, and wherein the trailing backhand weld arc trails the leading laser beam as the leading laser beam progresses in a weld direction.

8. The hybrid welding system of claim 7, wherein the weld area comprises a joint between at least two components.

9. The hybrid welding system of claim 7, wherein the arc welder is selected from a gas tungsten arc welder, a gas metal arc welder, a flux cored arc welder, or a plasma arc welder.

10. The hybrid welding system of claim 7, wherein the laser is selected from a Nd: YAG laser, a $CO_2$ laser, a fiber laser, or a disk laser.

11. The hybrid welding system of claim 7, wherein the laser has a power of less than about 4-kW.

12. The hybrid welding system of claim 7, wherein the at least one component has a thickness of at least about 6.35 mm.

13. The hybrid welding system of claim 7, wherein the leading laser beam and the trailing backhand weld arc advance in the weld direction at a rate from about 760 millimeters per minute to about 3050 millimeters per minute.

14. The hybrid welding system of claim 7, wherein the trailing backhand weld arc trails the leading laser beam by a distance from about 0.5 millimeters to about 12 millimeters.

15. A hybrid welding method comprising:
   directing a leading laser beam from a laser towards a weld area on at least one component; and,
   directing a trailing backhand weld arc from an arc welder towards the weld area to form a common molten pool, wherein the trailing backhand weld arc trails the leading laser beam as the leading laser beam progresses in a weld direction.

16. The method of claim 15, wherein directing the leading laser beam occurs at the same time as directing the trailing backhand weld arc.

17. The method of claim 15, wherein the weld area comprises a butt joint between at least two components.

18. The method of claim 15, wherein the leading laser beam is a defocused leading laser beam.

19. The method of claim 15, wherein the at least one component has a thickness of at least about 6.35 mm.

20. The method of claim 15, wherein the trailing backhand weld arc trails the leading laser beam by a distance from about 0.5 millimeters to about 12 millimeters.

* * * * *